United States Patent Office 2,749,284
Patented June 5, 1956

2,749,284

TREATMENT OF SULPHUR-CONTAINING MINERAL OILS WITH KEROSENE PEROXIDES

Dennis Alexander John Noble, Sunbury-on-Thames, England, assignor to The British Petroleum Company Limited, a British joint-stock corporation No Drawing. Application November 14, 1951,
Serial No. 256,390

Claims priority, application Great Britain
November 15, 1950

6 Claims. (Cl. 196—29)

This invention relates to an improved process for the treatment of sulphur-containing mineral oils. More particularly the invention relates to a process for reducing the total sulphur content of sulphur-containing mineral oil fractions.

Processes for sweetening or desulphurising mineral oils by oxidation are well known, conventional and widely used processes being the plumbite and copper sweetening processes wherein mercaptans are oxidised to less objectionable disulphides.

Although it has been stated in the technical literature that organic sulphides react with peroxides, with production of oxidation products such as sulphoxides and sulphones, there has hitherto been no successful application of peroxides as agents for effecting the refining of mineral oils, such as petroleum, for the conversion of undesirable sulphur compounds contained therein.

It is an object of the present invention to provide a novel process for the treatment of sulphur-containing mineral oil fractions. It is a further object to provide a novel and economically attractive process for reducing the total sulphur-content of sulphur containing mineral oil fractions. Other objects will appear hereinafter.

According to the present invention mineral oil fractions are treated by a process which comprises reacting the said mineral oil fraction with an organic peroxide under conditions such that oxidation products of the sulphur compounds are formed.

In general, the sulphur containing mineral oil fraction may be treated with the peroxide at any temperature within the range 50° to 180° C., operation with the range 120° to 150° being preferred.

In general a contact time of 10 to 30 minutes has been found satisfactory. Usually the peroxide is employed in admixture with a diluent which is conveniently a hydrocarbon or hydrocarbon mixture or solvent as hereinafter described.

If desired the reaction may be carried out with simultaneous air blowing of the reaction mixture.

It has been found that, in general, by operating according to this process the oxidation products are produced in a form in which they are readily separable from the treated mineral oil. It is thus a further feature of the present invention that sulphur containing mineral oil fraction is reacted with organic peroxides and the products of oxidation thereafter removed by physical and/or chemical means. Suitable methods of removal of the oxidation products include acid washing, solvent extraction, fractional distillation, extractive distillation, adsorption, or a combination of these, or these and other methods.

The organic peroxides which may be employed include hydroperoxides for example tertiary butyl hydroperoxide. A suitable peroxide-containing material for use in the process of the invention is obtained by the controlled aerial oxidation of hydrocarbons or naturally occurring, hydrocarbon-containing, materials such as mineral oil fractions. A very suitable peroxide containing material is obtained by the aerial oxidation of a sulphur-free and aromatic-free kerosine at a temperature of about 100° to 150° C., oxidation being continued until a total peroxide content of 5 to 15% by weight has been reached. Other suitable peroxide-containing materials are formed by air-blowing paraffin wax, white oils and white spirits.

In general, a paraffinic feedstock is preferred for the aerial oxidation, a suitable feedstock being obtained by treatment of a paraffin containing material, e. g. kerosine with urea to form a solid urea adduct which is separated from the liquid phase and a paraffin enriched fraction recovered by subsequent decomposition of the adduct. Conditions for the separation of hydrocarbons by urea adduction are described by Bengen in German patent application O. Z. 12,438, published in Technical Oil Mission Microfilm Reel 6 Frames 263–270, and elsewhere in the technical literature.

According to a modification of the above method for the preparation of a paraffinic material, thiourea is employed instead of urea. Since thiourea forms adducts with napthenes and branched chain paraffins but not with normal paraffins, the feedstock to the oxidation stage is in this case derived from the residue from the thiourea-adduction stage.

If desired the peroxide-containing material may be concentrated before use in the process of the invention. A convenient method of concentration is by extraction with a selective solvent, for example methanol (in which case the peroxide is obtained in the extract phase).

Solvent may be removed from the peroxide extract by conventional means, for example distillation, if necessary under reduced pressure. Alternatively, the extract phase, containing solvent, may be fed to the reaction stage for the oxidation of sulphur compound.

In general, the amount of the peroxide required for treating a sulphur-containing petroleum fraction will be adjusted to provide 0.25–1.0 atom of active peroxidic oxygen per atom of sulphur. Thus, in terms of $C_{12}$ hydroperoxide, the amount of peroxide will be between 1.5 and 6% by weight for treatment of a petroleum fraction containing 1% by weight of sulphur. For peroxides of lower molecular weights the amounts by weight required will be correspondingly smaller.

Preferably the removal of sulphur compounds from the peroxide treated oil is effected by methanol extraction. Other solvents such as methanol-water mixtures, containing up to 70% of water, acetone-water mixtures, containing up to 50% of water, sulphuric acid, and strong caustic soda solutions may be employed if desired. Alternatively, the sulphur compounds may be removed by distillation. If desired the solvent extraction may be followed by distillation of the raffinate for the separation of sulphur compounds boiling outside the range of the feedstock treated and which are not removable by the solvent employed.

The process of the present invention is considered to be of particular value for the desulphurisation or partial desulphurisation of petroleum distillation fractions, particularly kerosine and gas oil cuts.

The invention is illustrated but in no way limited by the following examples.

*Example 1*

A peroxide containing material was prepared by the aerial oxidation of kerosine containing less than 0.02% by weight sulphur and less than 2% by weight of aromatics, and having boiling range of 210°–240° C.

Two kilograms of the kerosine were charged into a glass vessel with 1 cc. of tertiary butyl hydroperoxide (as oxidation initiater) and air-blown at 240° C. at an air flow rate of 250 litres/hour/kilogram of charge for three hours. The product contained 11.5% by weight of peroxide (calculated at an estimated molecular weight of 216).

The crude oxidate was concentrated under the following condiitons:

The crude oxidate was neutralised with a 10% by weight solution of sodium or potassium hydroxide using litmus paper as an external indicator. The aqueous phase was then removed and the oily layer washed with a small quantity of water. After drying with anhydrous sodium sulphate the oil was extracted with a half volume of anhydrous methanol. A concentrated hydro-peroxide solution containing 38.8% by weight of peroxide (calculated at a molecular weight of 216), was obtained on removing the methanol at 35° C. under partial vacuum.

The material treated according to this example was a gas oil of the following characteristics:

| | |
|---|---|
| Specific gravity at 60° F./60° F | 0.8635 |
| Total sulphur, percent weight | 1.17 |
| Acidity, milligrams KOH/gram | 0.09 |
| Cetane number | 53 |
| Mercaptan sulphur, percent weight | 0.008 |
| Naphthenic acids, percent weight | 0.034 |
| Nitrogen content | 0.022 |

One hundred millilitres of the crude gas oil was heated to 130° C., 5.9 millilitres of the peroxide concentrate added, and the mixture air blown for 4 hours. Some material was lost by vaporisation in the air stream, and 95 millilitres of total treated product was obtained. Of this 92 millilitres was extracted with 5 portions of 20 millilitres of methanol, yielding 103 millilitres of methanol extract and, after removal of the methanol, 83 millilitres of gas oil raffinate which had a sulphur content of 0.75 percent. Removal of the methanol from the extract gave 9.3 grams of a dark oil containing 3.6 percent of sulphur.

*Example 2*

The gas oil feedstock employed was the same as that described in Example 1.

An aromatic-free and sulphur-free kerosine was fractionated to give a 230–235° C. cut and acid washed twice with equal volumes of 98% by weight sulphuric acid. After water, soda and final water washing the cut was filterd through silica gel and air blown at 140° C. for 3.5 hours. The product obtained had a peroxide value of 12.75% by weight calculated as $C_{13}OOH$.

The oxidate was neutralised with sodium hydroxide solution, separated from the aqueous phase, dried and extracted with 50% by volume of methanol.

Fifty grams of the crude gas oil and 8.77 grams of the peroxide concentrate containing 36.6% by weight of peroxide (calculated as $C_{13}OOH$) were heated together for 3.5 hours at 130° C. After extraction of the mixture with five successive quantities of 25 ml. absolute methanol and removal of dissolved methanol, the raffinate oil (peroxide concentrate) was shown on analysis to obtain 0.50% by weight of sulphur.

*Example 3*

Twenty-five grams of a gas oil feedstock, having a sulphur content of 0.99% by weight, was heated for 3.5 hours at 130° C. with 6 grams of a 30.62% kerosine peroxide concentrate, prepared in similar manner to that described in Example 1. After methanol extraction and removal of methanol from the raffinate, the recovered oil was shown, on analysis to contain 0.36% of sulphur.

*Example 4*

The gas oil feedstock employed was the same as that described in Example 1.

Thirty millilitres of the crude gas oil and 10 ml. of a kerosine peroxide material containing 9.49 percent by weight of peroxide were heated to 101° C. for 64 hours, during which time a slow stream of air was dispersed in the oil by means of a sintered glass disc. After this time the peroxide value was zero. The mixture was then filtered, extracted with methanol as described in Example 1, and methanol removed from th raffinate oil. The recovered oil was shown by analysis to have a sulphur content of 0.59 percent by weight.

*Example 5*

The gas oil feedstock and kerosine peroxide material employed were as described in Example 4.

A slow stream of air was passed through 50 millilitres of the crude gas oil heated to 120° C. and ten millilitres of the kerosine peroxide material was then added dropwise over a period of 3.5 hours. After this time the temperature was raised to 145° C. for 5 minutes. The mixture was then extracted with methanol as described in Example 1, yielding a raffinate oil of sulphur content 0.73 percent by weight. By way of comparison the same treatment without addition of peroxide concentrate gave an oil of sulphur content 1.09 percent by weight.

I claim:

1. A process for treating a mineral oil fraction containing sulphur compounds, said fraction selected from the group consisting of a kerosene cut and a gas oil cut, which comprises reacting said fraction with an organic peroxide-containing product at a temperature within the range of about 50° to 180° C. whereby oxidation products of the sulphur compounds are formed, said peroxide-containing product obtained by the partial aerial oxidation of a substantially sulphur-free and aromatic-free, paraffinic kerosene fraction of petroleum at a temperature of about 100° to 150° C. and for a period of time sufficient to produce a total peroxide content of about 5 to 15% by weight, thereafter removing the oxidation products from the products so obtained.

2. A process for treating a mineral oil fraction containing sulphur compounds, said fraction selected from the group consisting of a kerosene cut and a gas oil cut, which comprises reacting said fraction with an organic peroxide-containing product at a temperature within the range of about 50° to 180° C. whereby oxidation products of the sulphur compounds are formed, said peroxide-containing product obtained by the partial aerial oxidation of a substantially sulphur-free and aromatic-free, paraffinic kerosene fraction of petroleum at a temperature of about 100° to 150° C. and for a period of time sufficient to produce a total peroxide content of about 5 to 15% by weight, thereafter extracting the products so obtained with a polar solvent, separating an extract phase comprising said oxidation products and a raffinate of reduced sulphur content, and recovering said raffinate.

3. A process according to claim 2 wherein the petroleum fraction is a gas oil cut, and the amount of peroxide employed lying within the range of 1 to 10% by weight of the gas oil cut treated.

4. A process in accordance with claim 1 wherein the products so obtained are subjected to fractional distillation for the separation of a hydrocarbon fraction of low sulphur content from a fraction of relatively high sulphur content.

5. A process as specified in claim 2 in which the solvent employed for effecting solvent extraction comprises methanol.

6. A process as specified in claim 2 in which the raffinate is subjected to fractional distillation for the removal of a bottoms fraction comprising sulphur compounds boiling above the boiling range of the hydrocarbons of the mineral oil fraction, and wherein said hydrocarbons are recovered as an overhead fraction.

References Cited in the file of this patent

UNITED STATES PATENTS

| | | |
|---|---|---|
| 1,840,269 | Borgstrom | Jan. 5, 1932 |
| 2,417,280 | Viles | Mar. 11, 1947 |
| 2,427,212 | Henderson et al. | Sept. 9, 1947 |
| 2,593,761 | Johnstone | Apr. 22, 1952 |